United States Patent
Jarvis

(10) Patent No.: US 8,578,141 B2
(45) Date of Patent: Nov. 5, 2013

(54) LOOP PREDICTOR AND METHOD FOR INSTRUCTION FETCHING USING A LOOP PREDICTOR

(75) Inventor: Anthony Jarvis, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 442 days.

(21) Appl. No.: 12/947,134

(22) Filed: Nov. 16, 2010

(65) Prior Publication Data

US 2012/0124344 A1     May 17, 2012

(51) Int. Cl.
    *G06F 7/38*     (2006.01)
    *G06F 9/00*     (2006.01)
    *G06F 9/44*     (2006.01)
    *G06F 15/00*     (2006.01)

(52) U.S. Cl.
    USPC ........................................................ 712/241

(58) Field of Classification Search
    None
    See application file for complete search history.

(56) References Cited

U.S. PATENT DOCUMENTS

| | | | | |
|---|---|---|---|---|
| 5,909,573 A * | 6/1999 | Sheaffer | | 712/240 |
| 7,010,676 B2 * | 3/2006 | Busaba et al. | | 712/239 |
| 7,130,991 B1 * | 10/2006 | Butler | | 712/241 |
| 7,877,742 B2 * | 1/2011 | Duale et al. | | 717/150 |

* cited by examiner

*Primary Examiner* — Corey S Faherty
(74) *Attorney, Agent, or Firm* — Volpe and Koenig, P.C.

(57) ABSTRACT

A loop predictor and a method for instruction fetching using a loop predictor. A processor may include a loop predictor in addition to a primary branch predictor. A relatively common scenario in program execution is that a set of branches repeat over and over forming a loop. The loop may be detected based on a repeated pattern of access to a data structure used for branch prediction. Once a loop is detected and it may be determined whether the codes would stay in the loop for at least a duration sufficient to disable the branch prediction. On a determination that the detected loop is locked, a sequence of instruction addresses in one iteration of the detected loop may be captured in a buffer and the branch predictor may be turned off and a sequence of fetch instructions may be played from the buffer.

22 Claims, 3 Drawing Sheets

LOOP PREDICTOR AND METHOD FOR INSTRUCTION FETCHING USING A LOOP PREDICTOR

FIELD OF INVENTION

This application is related to microprocessors, including central processing units (CPUs) and graphical processing units (GPUs).

BACKGROUND

Processing units are utilized in a multiple of applications. A standard configuration is to couple a processor with a storage unit, such as a cache, a system memory, or the like. Processors may execute a fetch operation to fetch instructions from the storage unit as needed.

In order to speed up the operation of the processor which is performing a fetch operation, a branch predictor may be used. A branch predictor predicts the direction of the branch instruction, (i.e., taken or not-taken), and the branch target address before the branch instruction reaches the execution stage in the pipeline.

This is known as "pre-fetching." Although pre-fetching and speculatively executing the instructions without knowing the actual direction of the branch instruction may result in speeding up the processing of an instruction, it may have the opposite effect and may result in stalling the pipeline if the branch direction is mis-predicted. If the branch mis-prediction occurs, the pipeline needs to be flushed and the instructions are re-executed. This may severely impact the performance of the system.

Several different types of branch predictors have been used. A bimodal predictor may make a prediction based on recent history of a particular branch's execution, and give a prediction of taken or not-taken. A global predictor may make a prediction based upon recent history of all the branches' execution, not just the particular branch of interest. A two-level adaptive predictor with a globally shared history buffer, a pattern history table, and an additional local saturating counter may also be used such that the outputs of the local and the global predictors are XORed with each other to provide a final prediction. More than one prediction mechanism may be used simultaneously and a final prediction may be made based either on a meta-predictor that remembers which of the predictors has made the best predictions in the past, or a majority vote function based on an odd number of different predictors. However, branch predictors are typically large and complex. As a result, they consume a lot of power and incur a latency penalty for predicting branches.

SUMMARY OF EMBODIMENTS OF THE PRESENT DISCLOSURE

An improved loop predictor and a method for instruction fetching using a loop predictor are disclosed. A processor may include a loop predictor in addition to a branch predictor. A relatively common scenario in program execution is that a set of branches repeat over and over, thereby forming a loop. The loop may be detected based upon a repeated pattern of access to a data structure used for branch prediction, (e.g., branch target buffer (BTB) in a branch predictor). Once a loop is detected it may be determined whether the instruction codes will stay in the loop for at least a duration sufficient to disable the branch prediction, (i.e., the loop is "locked"). On a determination that the detected loop is locked, a sequence of instruction addresses in one iteration of the detected loop may be captured in a buffer. The branch predictor may be then turned off and the stored sequence of fetch addresses may be played from the buffer.

BRIEF DESCRIPTION OF THE DRAWINGS

A more detailed understanding may be had from the following description, given by way of example in conjunction with the accompanying drawings wherein.

DETAILED DESCRIPTION

Figure 1:
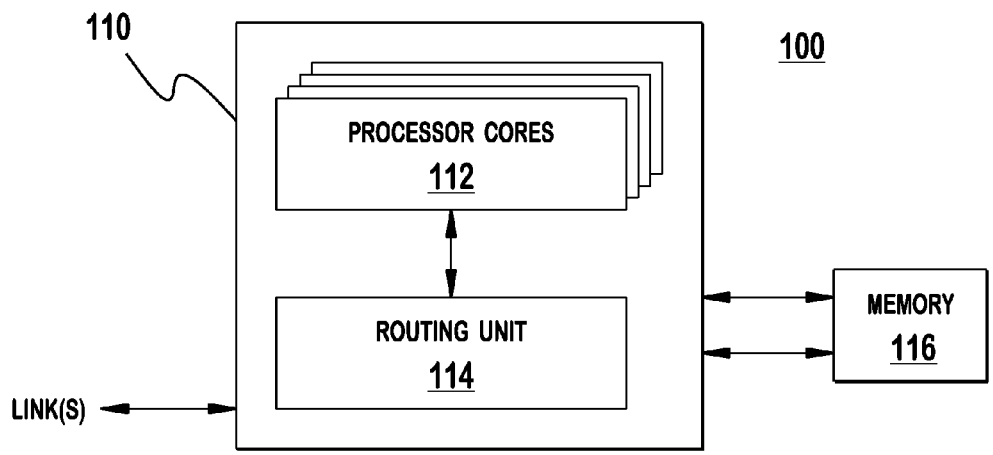
FIG. 1 shows an example micro-processor system.

The embodiments will be described with reference to the drawing figures wherein like numerals represent like elements throughout.

A relatively common scenario in program execution is that a set of branches repeats over and over, thereby forming a loop. In accordance with one embodiment, the power and latency penalty of using a primary branch predictor may be avoided by using a smaller structure, (i.e., a loop predictor), which uses less power and has lower latency, and turning off the primary branch predictor.

FIG. 1 shows a structure of an example microprocessor system 100. The microprocessor system 100 may include at least one processor 110 and at least one memory 116. As used hereafter, the term "processor" is intended to refer to a microprocessor, one or more central processing units (CPU), one or more graphical processing units (GPU), a combination thereof, or the like. The term "memory" is intended to refer to any type of electronic storage unit, such as a dynamic random access memory (DRAM), a cache memory, a buffer, or the like. The processor 110 may include one or more processor cores 112 and a routing unit 114. The processor 110 may also include a cache(s) or other components (not shown). The routing unit 114 may be used to communicate between the processor core(s) 112 and various components of the system. It should be noted that FIG. 1 is provided as an example, not as a limitation, and even though only one processor 110 with multiple processor cores 112 is depicted in FIG. 1, the embodiments disclosed herein are applicable to a single core processor, a multiple core processor, and a single or multiple core processing system.

Figure 2:
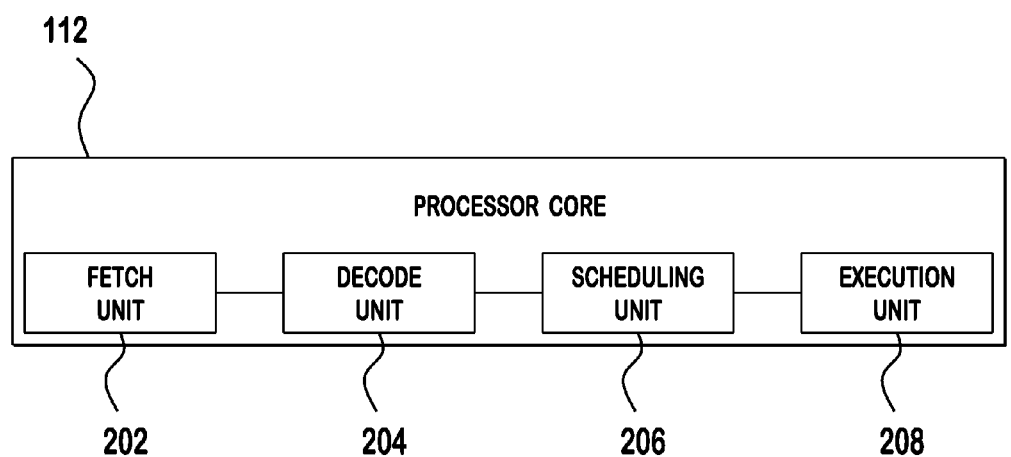
FIG. 2 shows portions of the processor core and illustrates the flow of instructions through the processor core.

FIG. 2 shows portions of the processor core 112 and illustrates the flow of instructions through the processor core 112. The processor core 112 may include a fetch unit 202, a decode unit 204, a scheduling unit 206, and an execution unit 208. The fetch unit 202 fetches instructions (including instructions with conditional or unconditional branches) to be decoded by the decode unit 204. The instructions may be fetched from a memory. The decode unit 204 decodes the fetched instructions. For example, the decode unit 204 may decode the fetched instructions into a plurality of micro-operations. The scheduling unit 206 performs various operations associated with storing decoded instructions and issuing the decoded instructions to the execution unit 208. The execution unit 208 executes the dispatched decoded instructions.

Figure 3:
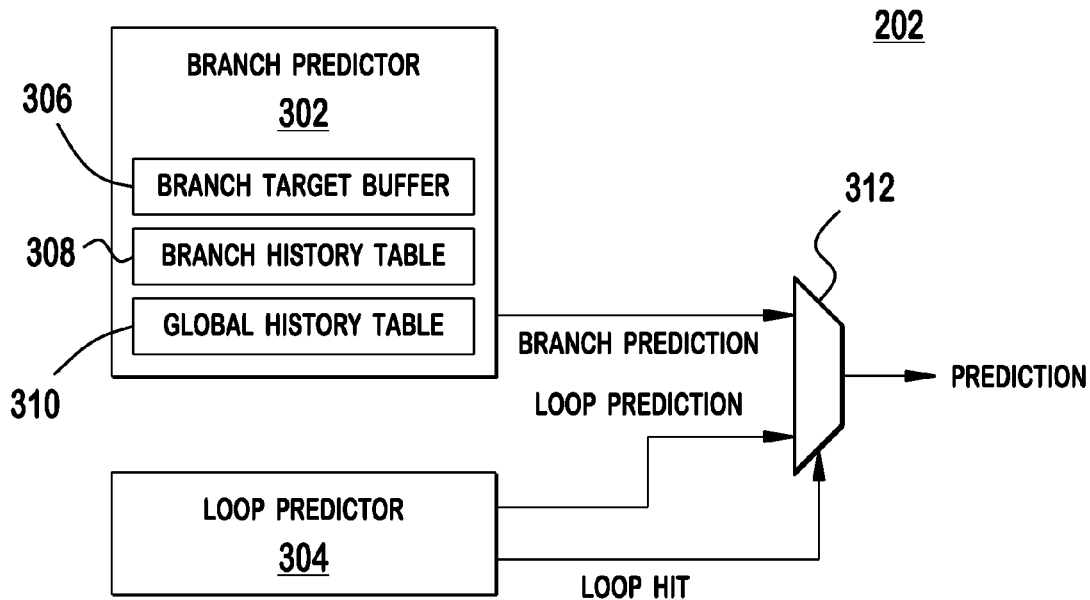
FIG. 3 shows portions of an example fetch unit in accordance with one embodiment.

FIG. 3 shows portions of an example fetch unit 202 in accordance with one embodiment. The fetch unit 202 includes a branch predictor 302 and a loop predictor 304. The branch predictor 302 predicts a branch direction and a branch target address using any type of, or any combination of, the conventional static and/or dynamic branch prediction methods including, but not limited to, bimodal branch prediction, correlated branch prediction, branch prediction using global, per-set and/or per-address branch histories and a pattern history table, prediction using an indirect target array, prediction using a return address stack, hybrid branch prediction, or the like.

The branch predictor 302 may include a branch target buffer (BTB) 306, a branch history table 308, and/or a global history table 310. The BTB 306 is a cache containing a branch target address, a predicted branch direction, and a tag for the branch instruction. For each instruction to be fetched, a BTB 306 is accessed, and if the branch instruction is found in the BTB 306, (i.e., a BTB hit), the corresponding branch target address may be output depending on the predicted branch direction.

The branch history table 308 includes a recent history of the predicted branch directions of a specific branch instruction. The global history table 310 includes the recent history of the predicted branch directions of all branch instructions.

In accordance with one embodiment, as shown in FIG. 3, the branch direction and the branch target address are generated from the branch predictor 302 until a loop is detected by the loop predictor 304. Once a loop is detected by the loop predictor 304, (i.e., a loop hit bit is asserted), the branch predictor 302 may be turned off and the instruction flows may be generated from the loop predictor 304 through a multiplexer 312 until a branch mis-prediction, a cluster redirect, or the like occurs. For example, a loop may be detected by detecting a repeating pattern of an access to the branch predictor structure (e.g., BTB 306). As an example, the repeating pattern to the BTB 306, (and therefore a loop), may be detected by using a recent branch history register 404 and a loop watcher 406 in FIG. 4, which will be explained in detail below.

Figure 4:
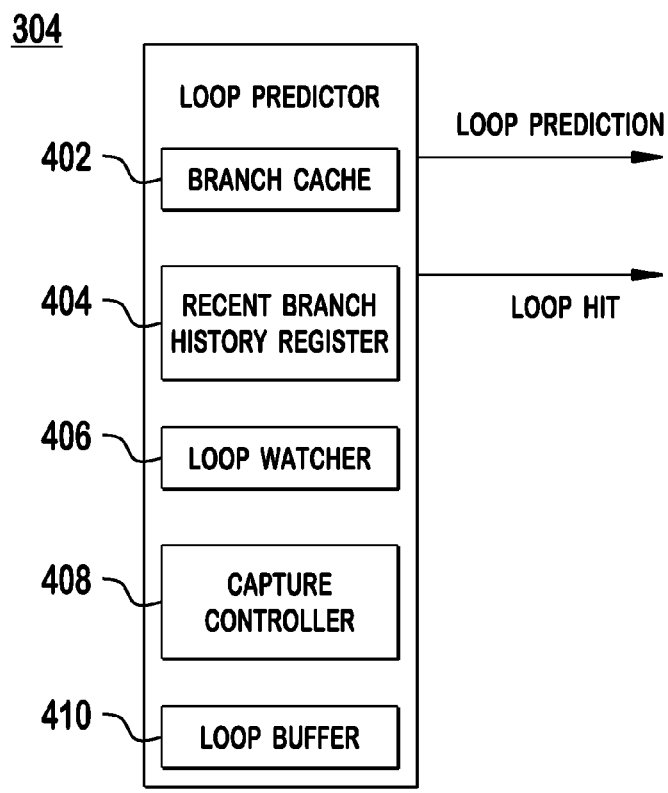
FIG. 4 shows an example loop predictor in accordance with one embodiment.

FIG. 4 shows an example loop predictor 304 in accordance with one embodiment. The loop predictor 304 may include a branch cache 402 (optional), a recent branch history register 404, a loop watcher 406, a capture controller 408, and a loop buffer 410.

When there is a predicted branch, (e.g., a BTB hit), the physical index to the BTB 306 may be stored in the branch cache 402, (i.e., each entry in the branch cache 402 contains the BTB location). For example, for a 4-way 128 entry level 1 (L1) BTB, the branch cache 402 may include a nine bit value to uniquely identify the L1 BTB entry, (i.e., each entry of the branch cache 402 is a concatenation of the two bit way and the seven bit BTB index). The branch cache 402 may use a replacement algorithm such as ideal least recently used (LRU), or pseudo LRU, or the like. The branch cache 402 may use a full least recently used (LRU) replacement algorithm, or the like. The branch cache 402 may be shared between multiple threads, or a separate branch cache 402 may be provided for each thread. The index into the branch cache 402 may be used as a branch identifier, which is referred to as the "branch cache ID" hereinafter. For example, if the branch cache 402 has eight entries, a three-bit index to the branch cache 402 may be used as the branch cache ID.

The recent branch history register 404, (e.g., a shift register), records at least one of the following information about the last N predicted branches (where N is a predetermined number): the branch cache ID, if used, (alternatively, if the branch cache 402 is not used, any type of branch identifier may be used, (e.g., the BTB index, or a hash of the instruction address, etc.)), whether the branch cache ID is valid, the predicted branch direction, whether the branch was a conditional jump or a call or return instruction, or has a variable indirect target, or the like. Whenever there is a predicted branch (e.g., a BTB hit), the recent branch history register 404 is updated, (i.e., an old record is shifted out and a new record is shifted in). By using the index to the branch cache 402 instead of using other references, such as references to the branch predictor (e.g., BTB), which is much larger than the branch cache ID, the amount of information that needs to be moved in the recent branch history register 404 may be minimized and processing power may be saved.

A plurality of loop watchers 406 (state machines) are provided, one for each loop size (measured by the branch count in the loop) supported by the loop predictor 304. For example, six loop watchers may be provided for the loops of size from one to six measured by the number of branch instructions in the loop. Each loop watcher 406 may be updated as a new entry enters into the recent branch history register 404, (i.e., each time there is a predicted branch). Each loop watcher 406 compares the branch prediction at hand with its own assigned position in the recent branch history register 404. For example, a loop watcher finite state machine for identifying a loop of size one, (i.e., a loop including one branch instruction), compares the branch prediction at hand with the first entry, (i.e., the most recent entry), in the recent branch history register 404, and a loop watcher finite state machine for identifying a loop of size two compares the branch prediction at hand with the second entry in the recent branch history register 404, and so on. Therefore, the loop watcher 406 for a loop of size one compares the two consecutive branch predictions and if there is a match, (i.e., the BTB indices of the two consecutive branch predictions are the same), a loop of size one is detected. The loop watcher 406 for a loop of size two compares the branch prediction at hand and the second most recent branch prediction, and if the BTB indices match, a loop of size two is detected.

The capture controller 408 captures a sequence of fetch addresses in one iteration of the loop in the loop buffer 410 based on the detected loop size by the loop watcher(s) 406. The capture controller 408 may include additional information for each branch in the loop, for example the number of fetches between each branch in the loop. The capture controller 408 may also collapse non-taken branches so they are recorded as part of the sequential fetch window information.

The loop buffer 410 may include a branch target address, a branch end pointer, a count of how many sequential fetch windows to predict before predicting the branch, and/or a branch type field. Once one iteration of the loop has been captured, the branch predictor 302 may be powered down and the fetch address sequence may be replayed from the loop buffer 410. This may continue speculatively until one of the conditional branches mis-predicts, at which time the branch predictor 302 will be powered up to its normal mode.

The recent branch history register 404, the loop watchers 406, the capture controller 408, and the loop buffer 410 may be provided per thread.

It should be noted that the structure of the loop predictor 304 in FIG. 4 is provided as an example and any variations are possible. For example, the branch cache 402 may not be used and a different reference, (e.g., an index to the BTB), may be used instead of the index to the branch cache 402.

Figure 5:
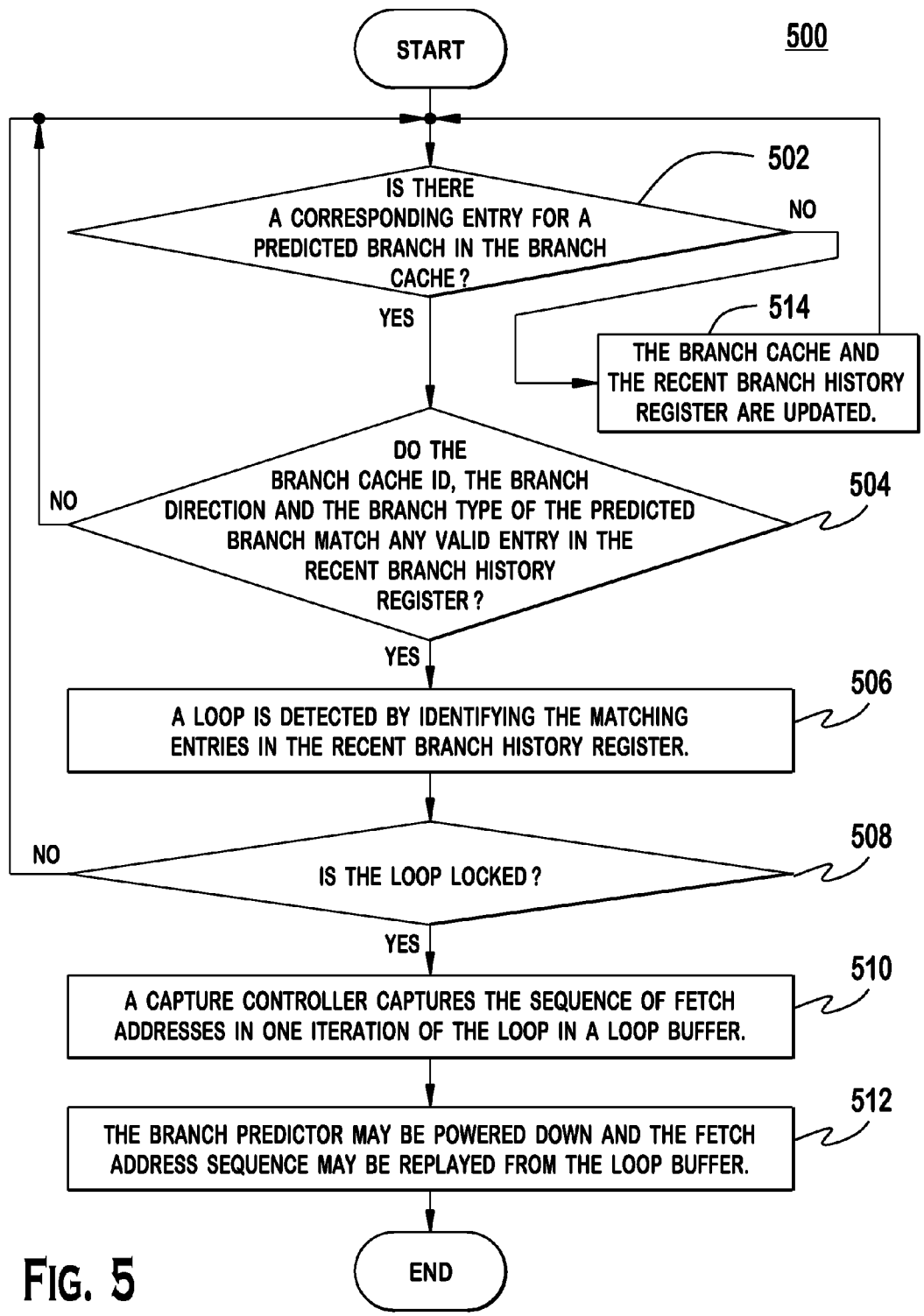
FIG. 5 is a flow diagram of an example process of branch prediction using a loop predictor in accordance with one embodiment.

FIG. 5 is a flow diagram of an example process 500 of branch prediction using a loop predictor 304 in accordance with one embodiment. Each time there is a predicted branch by the branch predictor 302, (e.g., a BTB hit), it is determined whether there is a corresponding entry in the branch cache 402 (step 502). If there is no corresponding entry in the branch cache 402, the branch cache 402 and the recent branch history register 404 are updated to add that entry (step 514). If there is a corresponding entry in the branch cache 402, it is further determined whether the branch cache ID, the branch direction, and the branch type of the predicted branch match the valid entries in the recent branch history register 404 (step 504). A loop is detected, for example, by identifying the matching entry in the recent branch history register 404 (step 506). For example, for a loop with a size of three (i.e., a loop with three branch instructions), the loop may be detected when the third entry in the recent branch history register 404 matches the predicted branch.

If a loop is detected, it may be further determined when the loop is locked, (i.e., the codes would stay in the loop for at least a duration sufficient to disable the branch prediction) (step 508). If the loop comprises only unconditional branches or static target indirect branches, at the first time a match is found with its entry in the recent branch history register 404, a locked loop may be declared.

If the loop contains a conditional jump(s) or a variable-target indirect jump(s), the locked loop may be declared based on, for example, a global history of branches. The branch predictor 302 includes the recent history of all predicted branches in the global history register. For example, the conditional jumps or variable target indirect jumps may be counted in the detected loop and the global history register is checked for a repeating pattern with the frequency of the conditional jumps or variable target indirect jumps count in the detected loop. Once the repeating pattern is observed in the global history register, a locked loop may be declared. For example, if the loop has two conditional branches or variable target indirect jumps in it and the global history has a repeating matching pattern spaced every two bits in the global history register, a locked loop may be declared.

Once any of the loop watchers 406 identifies a locked loop, a capture controller 408 captures the sequence of fetch addresses in one iteration of the loop in a loop buffer 410 (step 510). The capture controller 408 may include additional information for each branch in the loop, for example the number of fetches between each branch in the loop. The capture controller 408 may also collapse non-taken branches so they are recorded as part of the sequential fetch window information. Once the capture phase is complete, the capture controller 408 may stall the thread and wait for a predetermined number of cycles to allow the remaining fetches in the branch predictor pipe to drain.

Once one iteration of the loop has been captured and synchronization is complete, the branch predictor 302 may be powered down and the fetch address sequence may be replayed from the loop buffer 410 (step 512). The instruction cache unit in the fetch unit 202 for retrieving the predicted instructions from the cache or the memory may also be powered down if the instruction data is captured and replayed for one iteration of the loop. This may continue speculatively until one of the conditional branches mis-predicts, at which time the branch predictor 302 will be powered up to its normal mode.

In accordance with the embodiments, power may be saved by capturing and playing back loops with a dedicated structure, allowing clocking to be disabled for the main branch predictor including L1 and L2 BTB, the PHT, the perceptron tables, the return-stack, and/or the indirect target array. In accordance with the embodiments, fragmented fetch windows for non-taken branches may be collapsed, and the non-taken branch bubbles may be squashed so that the instruction byte buffer (IBB) utilization in the decoder may be improved.

Currently, the vast majority of electronic circuits are designed and manufactured by using software, (e.g., hardware description language (HDL)). HDL is a computer language for describing structure, operation, and/or behavior of electronic circuits. The loop predictor 304 (i.e., the electronic circuit) may be designed and manufactured by using software (e.g., HDL). HDL may be any one of the conventional HDLs that are currently being used or will be developed in the future. A set of instructions are generated with the HDL to describe the structure, operation, and/or behavior of the loop predictor 304. The set of instructions may be stored in any kind of computer-readable storage medium.

The set of instructions may comprise a detecting code segment for detecting a loop based on a repeated pattern of access to a data structure used for branch prediction, (e.g., BTB), a determining code segment for determining whether the detected loop is locked, a capturing code segment for capturing a sequence of instruction addresses in one iteration of the detected loop in a buffer on a determination that the detected loop is locked, and a generating code segment for generating a sequence of instructions for instruction fetching from the buffer. The set of instructions may further comprise a disabling code segment for disabling the branch prediction on a determination that the detected loop is locked.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method for instruction fetching in a processor using a loop predictor, the method comprising:
   detecting a loop based on a repeated pattern of access to a data structure used for branch prediction;
   capturing a sequence of instruction addresses in one iteration of the detected loop in a buffer on a determination that the detected loop is locked,
   wherein the detected loop is determined to be locked if it is determined based on the repeated pattern of access to the data structure that instructions stay in the loop for at least a duration sufficient to disable the branch prediction; and
   generating a sequence of instruction addresses for instruction fetching from the buffer.

2. The method of claim 1 further comprising:
   disabling the branch prediction on a determination that the detected loop is locked.

3. The method of claim 1 further comprising:
  determining whether there is a corresponding entry in a branch cache when there is a predicted branch by the branch prediction, the branch cache including an index to the data structure used for the branch prediction; and
  determining whether a branch cache identity, a branch direction, and a branch type of the predicted branch match valid entries in a recent branch history register, wherein the loop is detected by identifying matching entries in the recent branch history register.

4. The method of claim 3 wherein the detected loop is determined to be locked on a condition that a match is found for a first time with an entry in the recent branch history register on a condition that the detected loop comprises at least one of an unconditional jump or a static target indirect.

5. The method of claim 3 wherein the determination whether the detected loop is locked is made based on a global history of branches.

6. The method of claim 5 further comprising:
  counting conditional jumps or variable target indirect jumps in the loop; and
  checking a global history register for a repeating pattern with a frequency of the conditional jumps or the variable-target indirect jumps, wherein the detected loop is determined to be locked on a condition that a matching pattern is found in the global history register.

7. The method of claim 1 further comprising:
  stalling a thread and waiting for a predetermined number of cycles to allow remaining fetches in a branch predictor pipe to drain on a condition that the sequence of instruction addresses is generated from the buffer.

8. The method of claim 1 further comprising:
  collapsing non-taken branches in the sequence of instruction addresses in the detected loop.

9. The method of claim 1 further comprising:
  disabling an instruction cache unit for fetching the instructions on a determination that the detected loop is locked.

10. A processor comprising:
  a branch predictor configured to predict a branch direction and a branch target; and
  a loop predictor configured to:
  detect a loop based on a repeated pattern of access to a data structure used for branch prediction,
  capture a sequence of instruction addresses in one iteration of the detected loop in a buffer on a determination that the detected loop is locked, the detected loop is determined to be locked if it is determined based on the repeated pattern of access to the data structure that instructions stay in the loop for at least a duration sufficient to disable the branch prediction, and
  generate a sequence of instruction addresses for instruction fetching from the buffer.

11. The processor of claim 10 wherein at least one of the branch predictor or an instruction cache unit for fetching the instructions is disabled on a determination that the detected loop is locked.

12. The processor of claim 10 wherein the loop predictor comprises:
  a recent branch history register for recording a history of recent branches including at least one of: a branch identity (ID), whether the branch ID is valid, a predicted branch direction, or whether a branch is a conditional jump, a call or return instruction, or has a variable indirect target;
  a loop watcher for detecting a loop by identifying a matching entry in the recent branch history register to a predicted branch, and detecting a repeating pattern of entries in the recent branch history register;
  a capture controller for capturing a sequence of instruction addresses in one iteration of the loop on a determination that a detected loop is locked; and
  a loop buffer for storing the sequence of instruction addresses such that the sequence of the instruction addresses is replayed from the loop buffer.

13. The processor of claim 12 further comprising:
  a branch cache for storing an index to the data structure used for the branch prediction corresponding to a predicted branch, wherein an index to the branch cache is used as the branch ID.

14. The processor of claim 12 wherein the locked loop is determined to be locked on a condition that a match is found for a first time with an entry in the recent branch history register on a condition that the detected loop comprises at least one of an unconditional jump or a static target indirect.

15. The processor of claim 12 wherein a locked loop is detected based on a global history of branches.

16. The processor of claim 15 further comprising:
  a counter for counting conditional jumps or variable target indirect jumps in the loop, wherein a locked loop is detected on a condition that a repeating pattern with a frequency of the conditional jumps or the variable-target indirect jumps is found in the global history register.

17. The processor of claim 12 wherein the capture controller stalls a thread and waits for a predetermined number of cycles to allow remaining fetches in a branch predictor pipe to drain on a condition that the sequence of instruction addresses is generated from the buffer.

18. The processor of claim 12 wherein the capture controller collapses non-taken branches in the sequence of instruction addresses in the detected loop.

19. A non-transitory computer-readable storage medium storing a set of instructions for execution by a processor to fetch an instruction using a loop predictor, the set of instructions comprising:
  a detecting code segment for detecting a loop based on a repeated pattern of access to a data structure used for branch prediction;
  a determining code segment for determining whether the detected loop is locked;
  a capturing code segment for capturing a sequence of instruction addresses in one iteration of the detected loop in a buffer on a determination that the detected loop is locked, the detected loop is determined to be locked if it is determined based on the repeated pattern of access to the data structure that instructions stay in the loop for at least a duration sufficient to disable the branch prediction; and
  a generating code segment for generating a sequence of instruction addresses for instruction fetching from the buffer.

20. The non-transitory computer-readable storage medium of claim 19 wherein the set of instructions further comprises a disabling code segment for disabling the branch prediction on a determination that the detected loop is locked.

21. A non-transitory computer-readable storage medium storing a code for describing a structure and/or a behavior of a circuit configured to detect a loop based on a repeated pattern of access to a data structure used for branch prediction, capture a sequence of instruction addresses in one iteration of the detected loop in a buffer on a determination that the detected loop is locked, and generate a sequence of instruction addresses for instruction fetching from the buffer, wherein the detected loop is determined to be locked if it is determined based on the repeated pattern of access to the data structure that instructions stay in the loop for at least a duration sufficient to disable the branch prediction.

22. The non-transitory computer-readable storage medium of claim 21 wherein the code is written in a hardware description language (HDL).

* * * * *